United States Patent [19]

French et al.

[11] 3,721,280

[45] March 20, 1973

[54] SELF-PROPELLED TREE DELIMBER

[75] Inventors: John Lischer French, Moline, Ill.; Kenneth Quentin Kessler, Dubuque, Iowa; Welker W. Funk, Fresno, Calif.; Victor Charles Pierrot, III; Stanley Robert Hiseler, both of Dubuque, Iowa

[73] Assignee: Deere & Company, Moline, Ill.

[22] Filed: March 3, 1971

[21] Appl. No.: 120,501

[52] U.S. Cl. .................................. 144/2 Z, 180/25 R
[51] Int. Cl. ............................................ A01g 23/08
[58] Field of Search ...... 144/2 Z, 3 D, 34 R, 309 AC; 56/228; 180/21, 25 R, 25 A, 26 R, 26 A, 27; 280/34 R

[56] References Cited

FOREIGN PATENTS OR APPLICATIONS 236,888   7/9169   U.S.S.R. ............................... 144/2 Z

*Primary Examiner*—Gerald A. Dost
*Attorney*—H. Vincent Harsha, Harold M. Knoth, William A. Murray, John M. Nolan and Jimmie R. Oaks

[57] ABSTRACT

A self-propelled tree delimber includes a horizontal T-shaped frame having a length suitable for supporting full-length trees of medium size. A boom and grapple assembly is mounted on the head portion of the frame and is operable for lifting cut trees from the ground and placing them on the frame. A delimbing assembly is mounted for movement along tracks extending the length of the leg portion of the frame and includes pivoted blades arranged to receive and encircle the stem of a tree, when the tree is placed on the frame. A drive motor is mounted on the head portion of the frame and is drivingly connected to the delimbing assembly for propelling the assembly along the tracks to delimb any tree stem encircled by the blades. The leg portion of the frame is supported on a driven steerable wheel and the head portion of the frame is supported on a pair of driven wheels which are mounted for movement between working and transport positions for respectively moving the delimber perpendicular and parallel to its length. The leg portion of the frame is constructed in two sections which are disconnectible for shortening the length of the delimber for transport.

18 Claims, 15 Drawing Figures

PATENTED MAR 20 1973 3,721,280

INVENTORS
J. L. FRENCH
K. Q. KESSLER
W. W. FUNK
V. C. PIERROT, III
S. R. HISELER

INVENTORS
J. L. FRENCH
K. Q. KESSLER
W. W. FUNK
V. C. PIERROT, III
S. R. HISELER

INVENTORS
J. L. FRENCH
K. Q. KESSLER
W. W. FUNK
V. C. PIERROT, III
S. R. HISELER

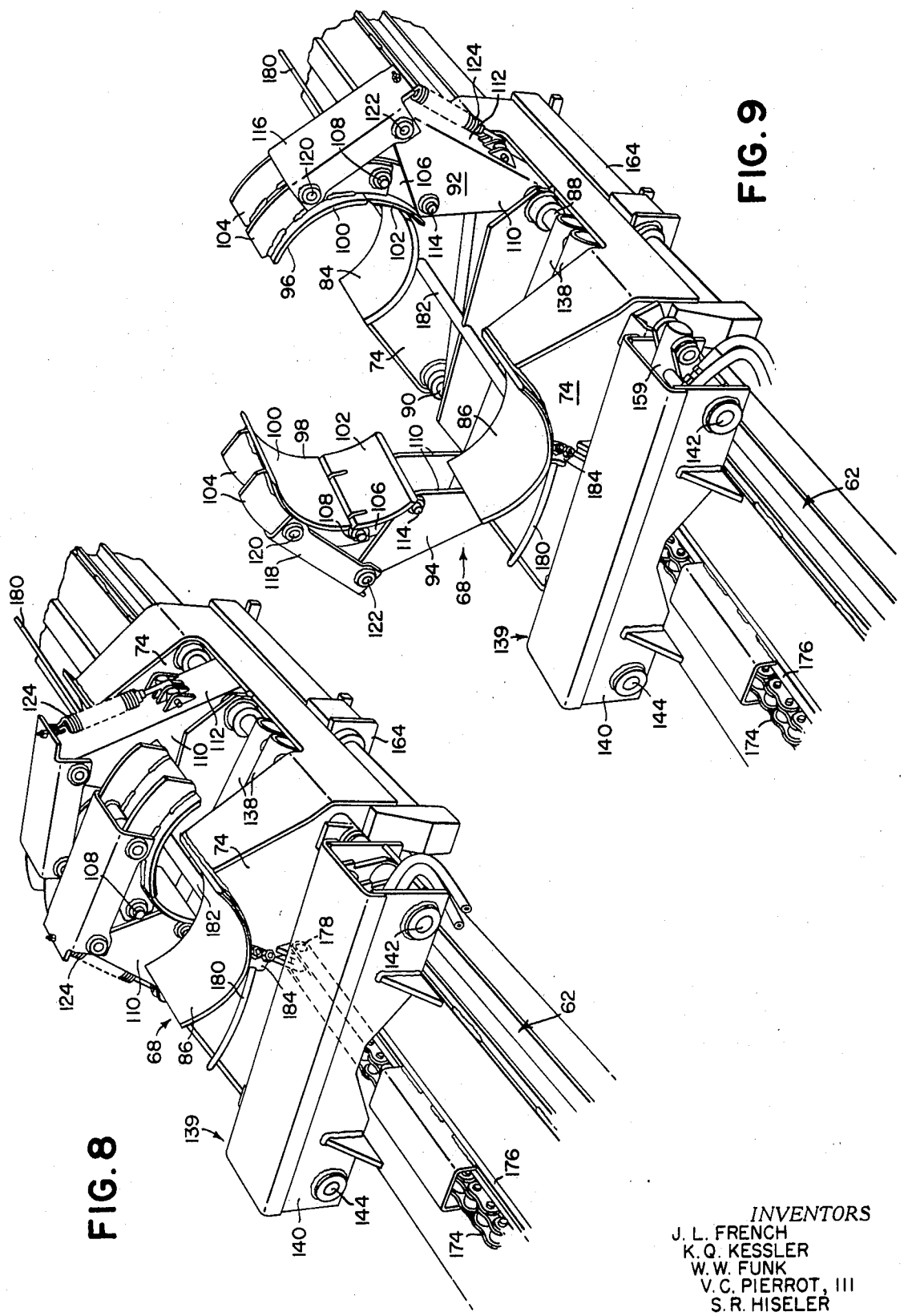

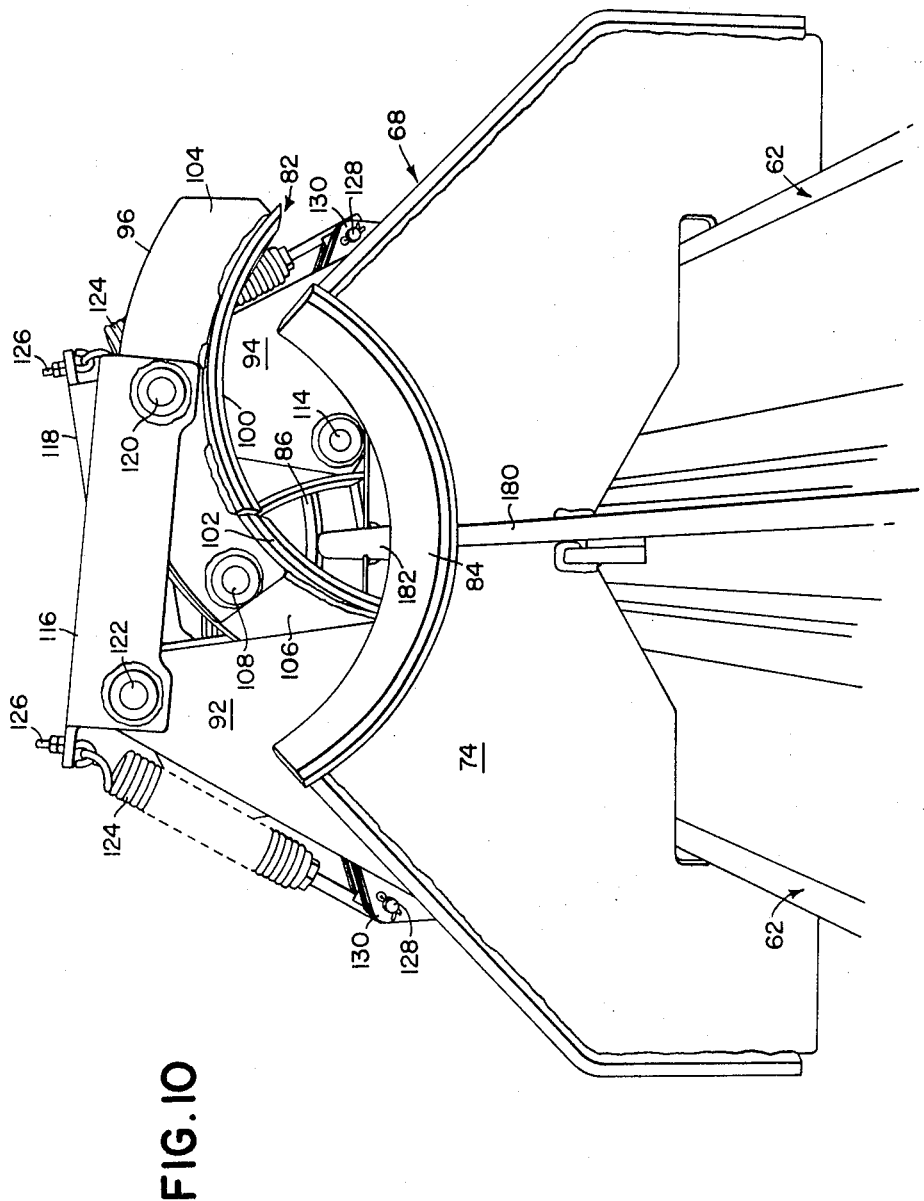

SELF-PROPELLED TREE DELIMBER

BACKGROUND OF THE INVENTION

The present invention relates to a tree delimber and more particularly relates to a self-propelled delimber for handling full-length felled trees.

Tree harvesting is often carried on where the topography and/or the condition of the terrain are adverse to vehicle mobility over the terrain. In such cases, it is common practice to first fell the trees, and then to skid the trees to a relatively level landing area where the trees are left in piles. Trees, when piled, are very difficult to delimb by manual means, such as chain saws, since the limbs are entangled. Known mechanical delimbers are either not suited for working on trees in a pile or they lack maneuverability and the ability to handle and effectively delimb a full-length tree in an efficient manner.

SUMMARY OF THE INVENTION

According to the present invention there is provided a delimbing vehicle for delimbing full-length felled trees.

It is a broad object of the invention to provide a vehicle which is particularly suited for working on trees which have been piled. More specifically, it is an object to provide a vehicle which is self-propelled and which is maneuverable for working alongside trees piled at a landing area.

Another object is to provide a delimber having a delimbing platform long enough for supporting substantially the entire length of a tree and being constructed of two sections, which are disconnectible for shortening the frame for transport.

Another object is to provide a vehicle wherein a power unit including an operator's station is fixed to one end of the delimbing platform and wherein an operator at the station has a clear view of the operations being performed.

Still another object is to provide a delimbing vehicle having a novel blade assembly for encircling and delimbing a tree stem.

These and other objects will become apparent from the ensuing description and appended drawings.

BRIEF DESCRIPTION OF THE DRAWINGS

FIG. 8 is an oblique perspective view of the delimbing head showing the blade assembly in the closed condition.

FIG. 9 is a view similar to FIG. 8 but showing the blade assembly in the open condition.

FIG. 10 is a perspective end view of the delimbing head shown in FIG. 8.

DESCRIPTION OF THE PREFERRED EMBODIMENT

Figure 1:
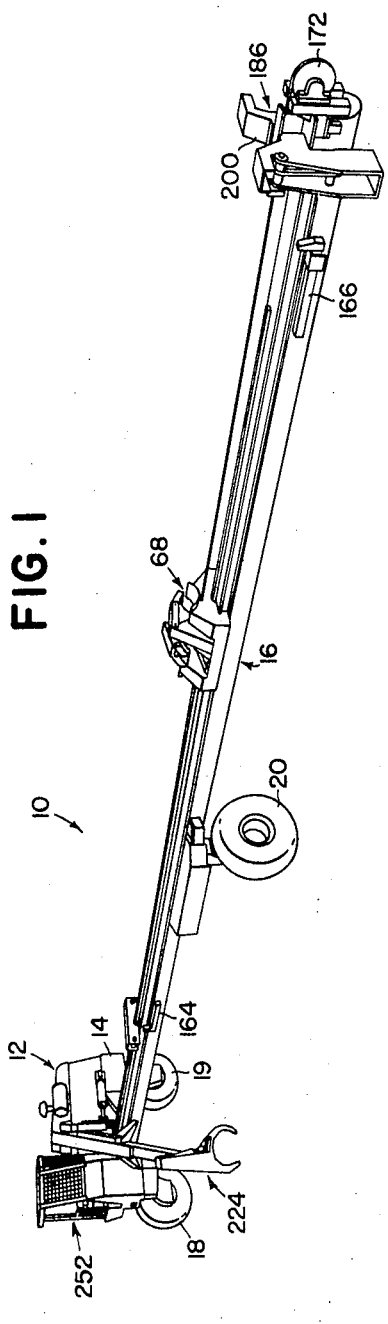
FIG. 1 is an oblique perspective view of a self-propelled delimbing vehicle constructed according to the principles of the present invention.

Referring now to the drawing, there is shown a generally T-shaped, self-propelled delimbing machine 10. The machine 10 includes a power unit 12 forming the head of the machine and having a generally horizontal frame 14 in which is fixed one end of an elongated, generally horizontal delimbing platform 16, which forms the leg of the machine. The frame 14 is supported on a pair of ground wheels 18 and 19 located under the opposite ends thereof, and the platform 16 is supported on a ground wheel 20 located approximately midway between its ends, thus leaving a substantial portion of the platform cantilevered beyond the wheel 20.

The wheels 18, 19 and 20 are individually driven and are turnable between a working position (FIG. 1), for advancing the machine 10 perpendicularly to the length of a pile of felled trees, and a transport position, for advancing the machine 10 parallel to its length.

For this purpose, the wheels 18 and 19 are swivelly mounted by means of vertical spindles 22, which are rotatably received in receptacles 24 under the opposite ends of the frame 14. The spindles 22 are fixed to the tops of brackets 26 which are integral with drive housings 28, which are in turn fixed centrally to the wheels 18 and 19. A pair of reversible hydraulic motors 30 are mounted on the brackets 26 and include drive or output shafts which extend through a tube 32 to a drive, for the wheels, located in the housings 28. Remotely operable pins (not shown) are selectively engageable with aligned apertures in the frame 14 and the brackets 26 to lock the brackets to the frame to hold the wheels 18 and 19 either in their working or transport positions. It is to be noted that the wheels 18 and 19 are offset horizontally from the spindles 22 and when it is desired to move the wheels 18 and 19 between their working and transport positions, the lock pins are disengaged and the motors 30 are operated to drive the wheels about the spindle axes.

The wheel 20 is mounted quite similarly to the wheels 18 and 19. Specifically, the mounting includes a spindle 34 which is rotatably received in a receptacle 36 fixed to the side of the platform 16. The spindle 34 is fixed to the top of a bracket 38, which is integral with a drive housing 40, which is in turn fixed centrally to the wheel 20. A reversible hydraulic motor 42 is mounted on the bracket 38 and includes a drive or output shaft which extends through a tube 44 to a wheel drive in the housing 40. The wheel 20 is steerable between its working and transport positions by structure including a sprocket 46 fixed coaxially on the spindle 34 and having a length of roller chain 48 meshed therewith. The opposite ends of the chain 48 are fixed to the rod ends of a pair of hydraulic cylinders 50, which are in turn pivotally connected to a bracket 52 fixed to the platform 16.

The delimbing platform 16 includes a first tubular member 54, which extends from the power unit 12 to a location just beyond the wheel 20 whereat it abuts in end-to-end relationship with a second tubular member 56. The member 54 and 56 are held together by a tubular insert 60, which is located half in the member 54 and half in the member 56. Fasteners, such as screws and bolts (not shown), secure the members 54 and 56 to each other and to the insert 60. The platform 16 further includes a pair of guide tracks 62, which extend horizontally at its opposite sides along the length thereof. The tracks 62 are in the form of a first pair of channel members 64 which open outwardly from the opposite sides of the member 54 and a second pair of channel members 66 which open outwardly from the opposite sides of the member 56 and are in end-to-end abutment with the members 64. The break between that portion of the platform 16 including the tubular member 56 and the channel members 66, and the remainder of the platform, permits the member 56 to be disconnected from the member 54 to considerably shorten the length of the vehicle 10 for transporting the latter over a highway, or the like, or between widely separated landing sites.

A delimbing head or carriage is indicated in its entirety by the reference numeral 68 and includes an integral frame 70 which is mounted in straddling relationship to, and for movement along, the delimbing platform 16. The frame 70 includes a pair of square tubes 72, at its opposite sides beside the guide rails 62. The opposite ends of the tubes 72 are each interconnected by a pair of longitudinally spaced, vertical plates 74, which bridge the platform 16. The frame 70 also includes a plurality of support rollers 76, which are normally engaged with the bottom flanges of the tracks 62. The rollers 76 are mounted, one each, at the opposite ends of first and second pairs of arms 78 respectively rockingly mounted through means of first and second pairs of longitudinally spaced, transverse pivot structures 80 in the tubes 72.

A delimbing blade assembly 82 is carried by the frame 72 and includes a plurality of blades arranged for receiving and encircling a tree stem to be delimbed. Specifically, the assembly 82 includes a pair of arcuate, plate-like blades 84 and 86 respectively fixed to the leading and trailing ends of the frame 70, with reference to it moving away from the power unit 12. The blades 84 and 86 are disposed concave upwardly and are mounted centrally above the platform 16, thus providing a bed for receiving and engaging the underside of a tree stem lying along the platform 16. Right and left longitudinally extending, horizontal pivot shafts 88 and 90 are journaled in the frame 72 at the opposite sides of the platform 16. Fixed to the shafts 88 and 90, at longitudinally offset locations, are right and left arms 92 and 94 to which are connected right and left blades 96 and 98, which are adapted for swinging traversely, with the arms, between an open, separated position (FIG. 8) defining a passage for permitting tree stems to be received on the fixed blades 84 and 86, and a closed position wherein the blades 96 and 98 cooperate with the blades 84 and 86 to grasp and encircle a tree stem. It is to be noted that the blades 84, 86, 96 and 98 are appropriately beveled at their leading and trailing edges so that limbs may be removed in either direction of movement of the delimbing head 68.

The right and left blades 96 and 98 each include inner and outer blade sections 100 and 102, to the backsides of which are respectively fixed pairs of spaced straps 104 and 106. The straps 106 extend inwardly beyond the inner ends of the outer blade sections 102 and are spaced so as to overlap the outer ends of the straps 104 and are pivotally connected thereto by means of pins 108, thus forming hinge connections between the blade sections 100 and 102. The arms 92 and 94 each include a pair of vertical, longitudinally spaced, triangular plates 110 having a web 112 integral with and joining their longest sides. The inner ends of the pairs of straps 106 are respectively pivotally mounted, as at pins 114, between intermediate corners of the pairs of plates 110. A pair of channel-like links 116 and 118 each have one end which straddles an intermediate point on, and is pivotally connected to, an associated pair of the straps 104, as at pins 120, and the opposite end of each of the links 116 and 118 straddles the outer corners of, and are pivotally connected to, the arms 92 and 94, as at pins 122. Biasing the pairs of links 116 and 118 outwardly about the pins 122 so as to dispose the inner and outer blade sections 100 and 102 to form a smooth, continuous arc are a pair of tension springs 124 having their opposite ends connected to eye screw 126 located in the webs of the links 116 and 118 and to pins 128 received in ears 130 fixed to the webs 112 of the arms 92 and 94.

Figure 7:
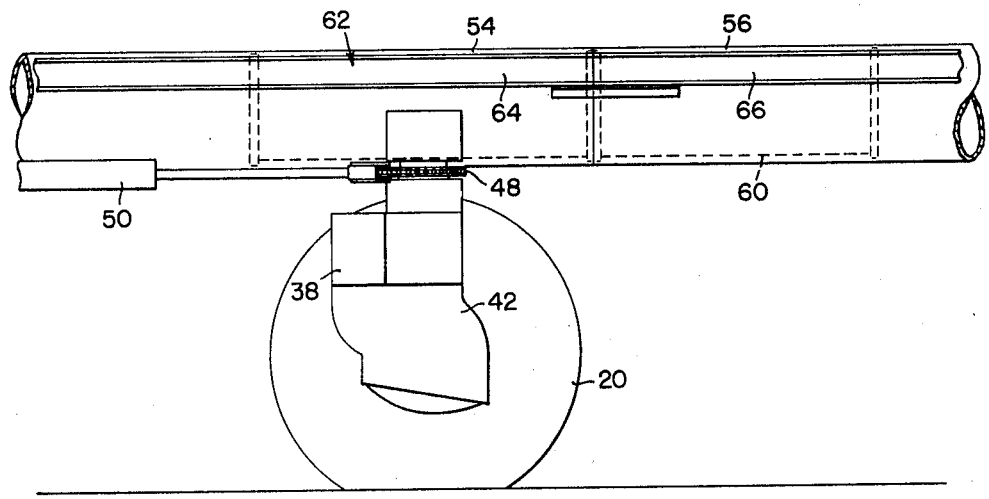
FIG. 7 is a side view of the delimbing platform showing the disconnectible joint therein.
Figure 13:
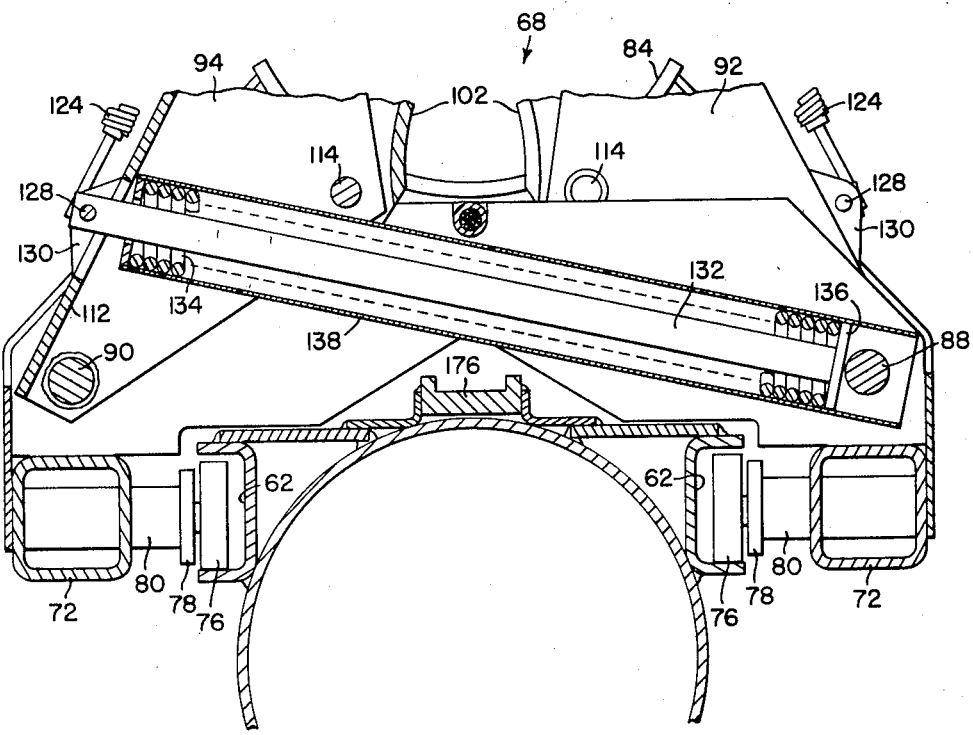
FIG. 13 is an end view of the delimbing head showing one of the spring assemblies for biasing the delimbing blades toward a tree stem.
Figure 14:
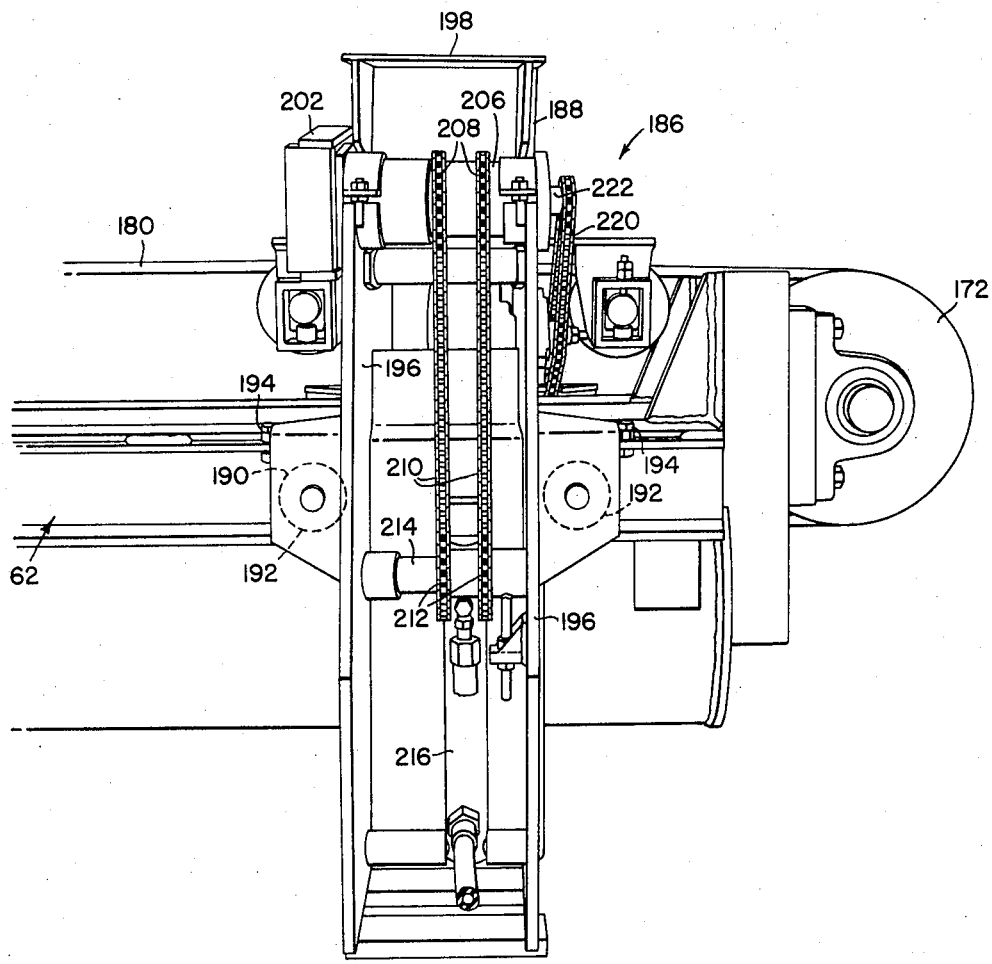
FIG. 14 is a right side perspective view of the topping mechanism.
Figure 15:
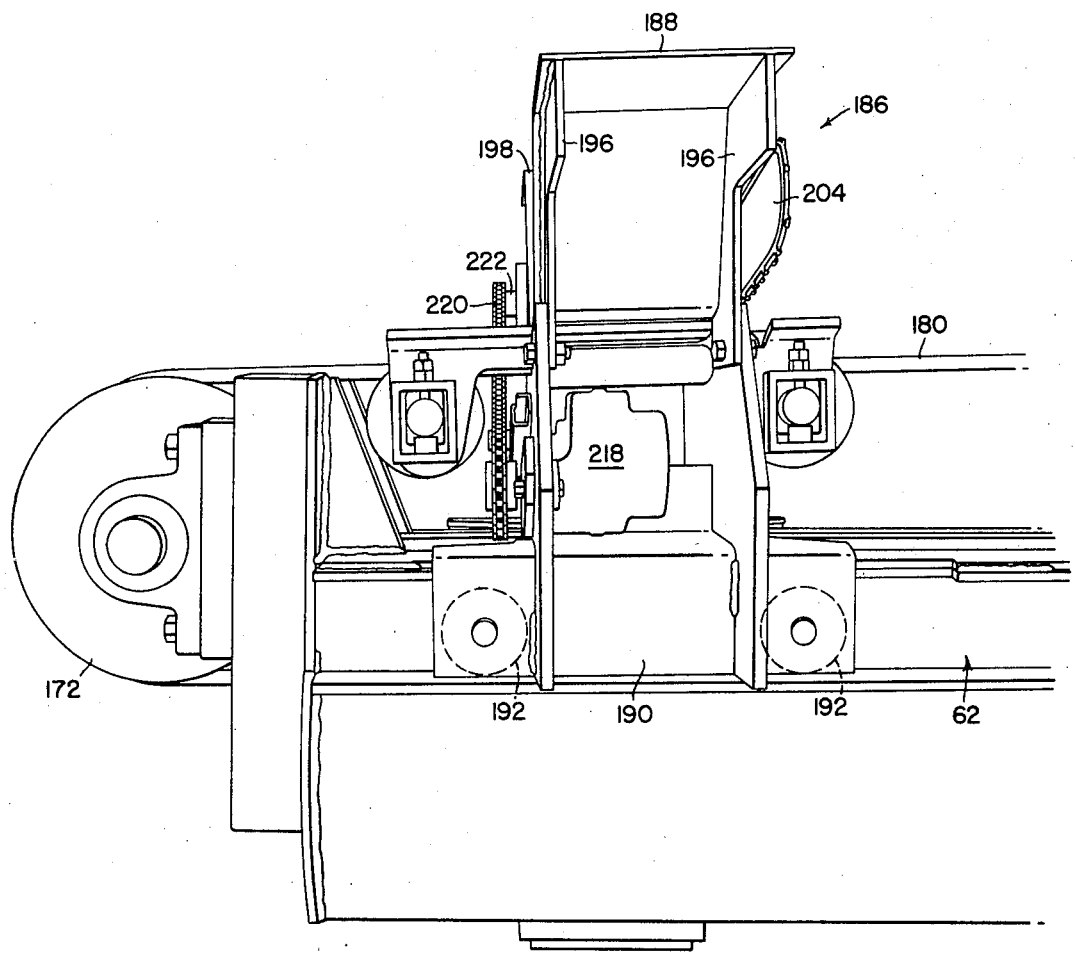
FIG. 15 is a left side perspective view of the topping mechanism.

The arms 92 and 94, hence the blades 96 and 98, are biased toward the closed position (FIG. 7) by spring-loaded structures including a pair of rods 132 associated with each arm and having one of their ends extending through apertures in the webs 112 and pivotally received on an associated pin 128. Compression springs 134 are received on the rods 132 and act between heads 136, at the free ends of the rods, and closed ends of tubes 138, which are coaxially received on the rods. The pair of tubes 138 associated with the right arm 92 have their ends pivotally received on the left pivot shaft 90 and the pair of tubes 138 associated with the left arm 94 have their ends pivotally received on the right pivot shaft 88.

Figure 11:
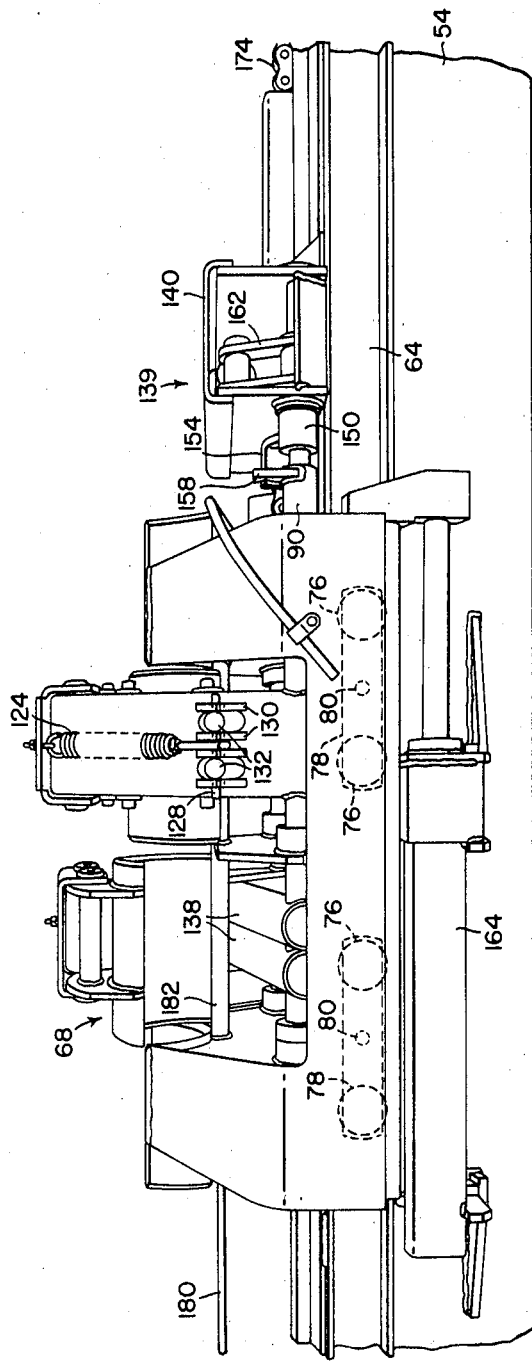
FIG. 11 is a perspective side view of the delimbing head shown in FIG. 8.
Figure 2:
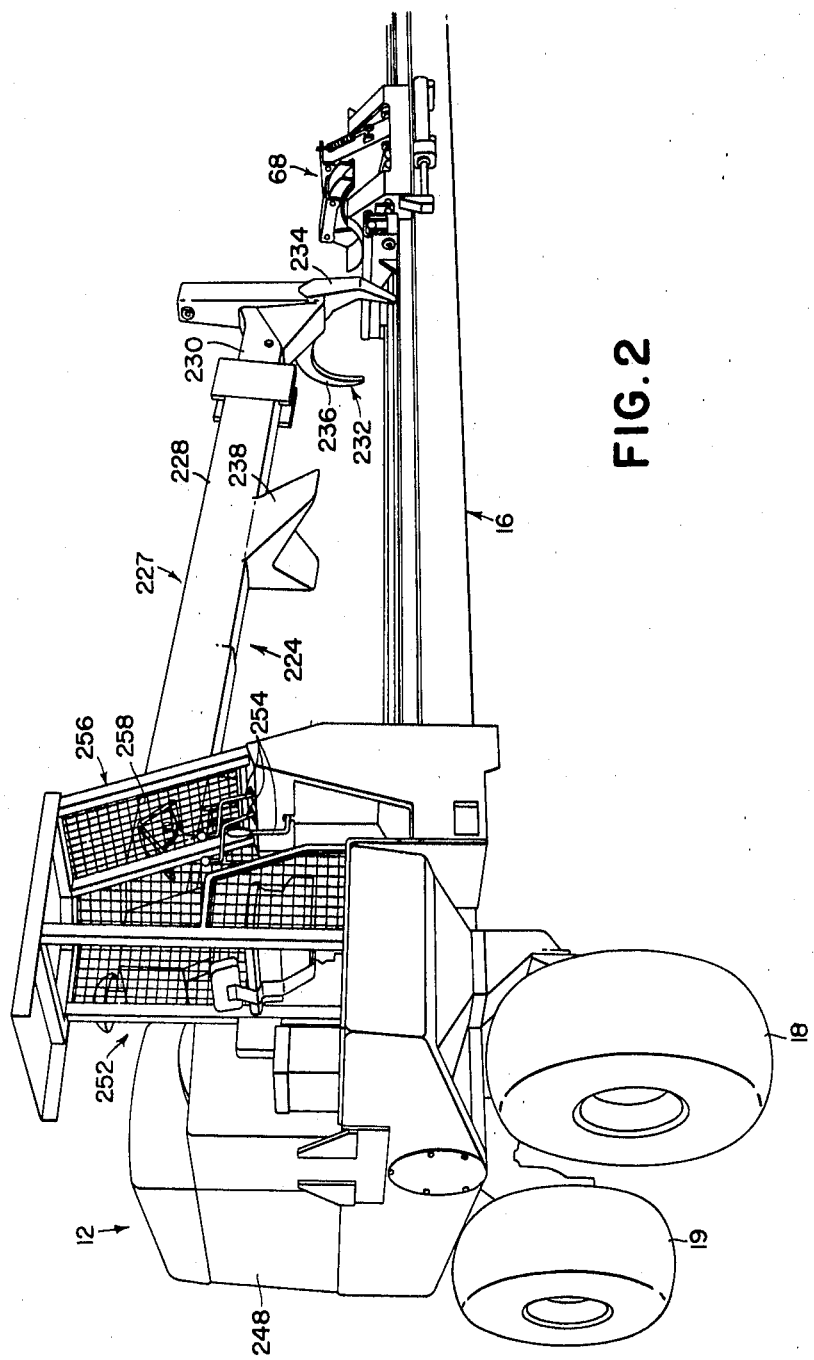
FIG. 2 is a perspective view of the operator's station and tree-handling boom and grapple assembly of the vehicle.
Figure 3:
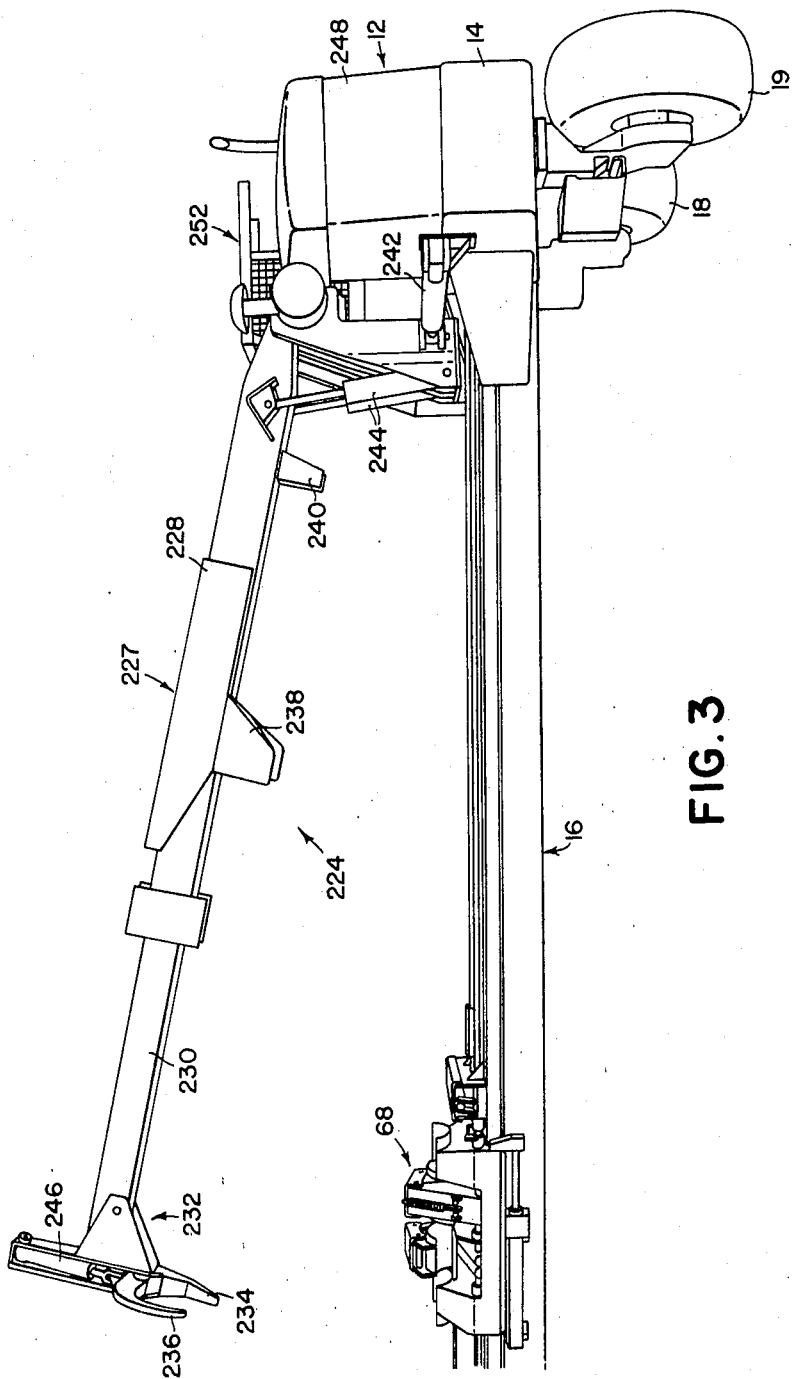
FIG. 3 is a view similar to FIG. 2 but taken from the opposite side of the vehicle.
Figure 4:
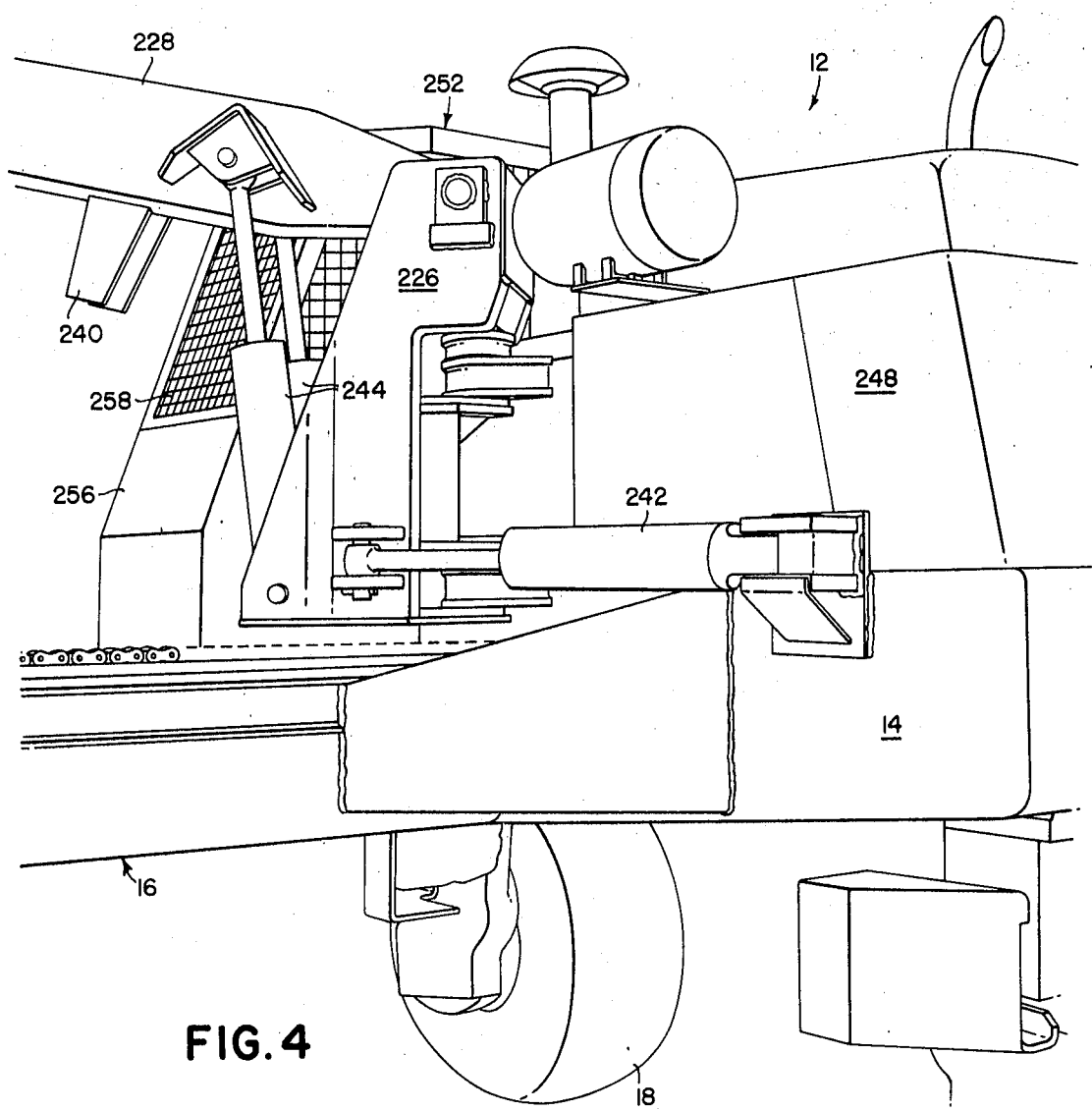
FIG. 4 is a perspective view showing the vertical pivotal connection of the tree-handling boom and grapple assembly.
Figure 5:
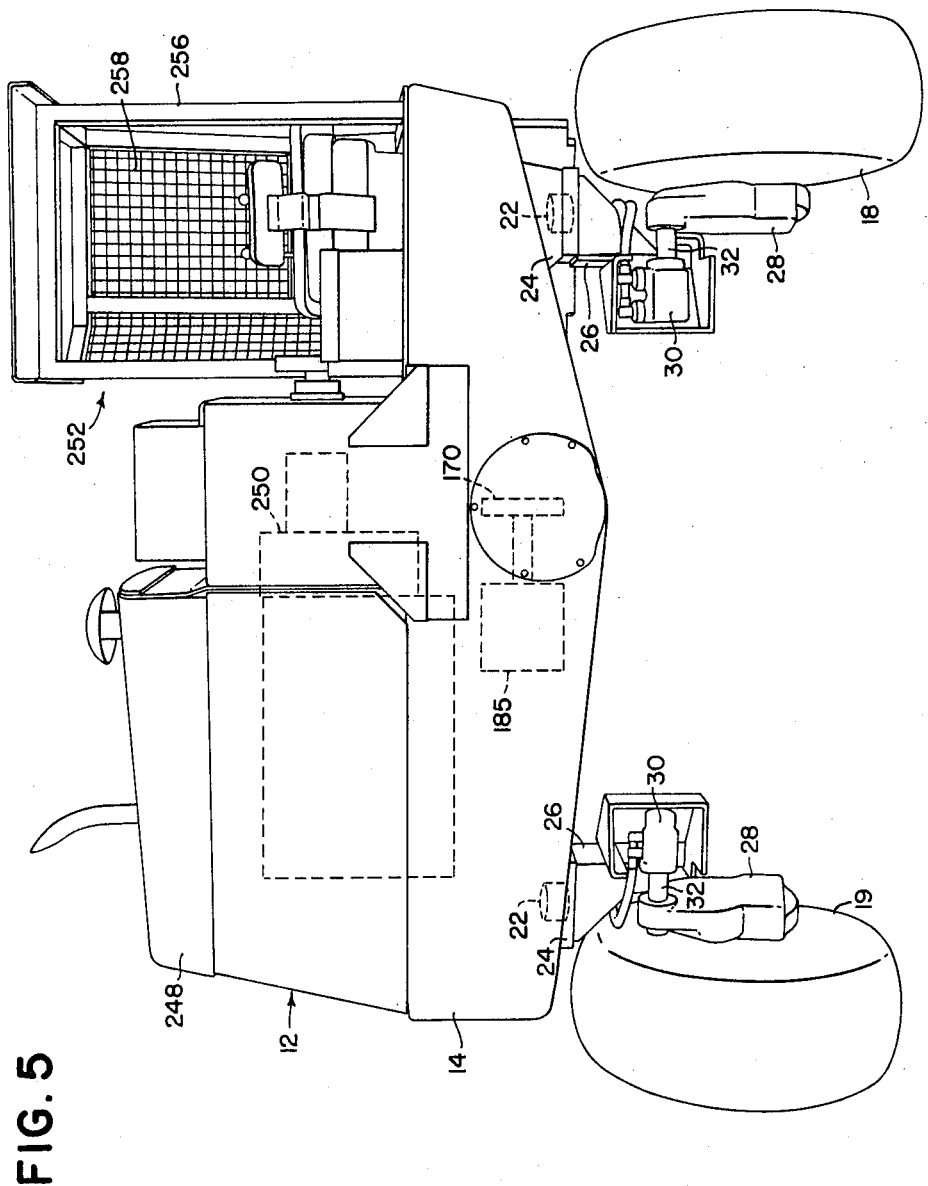
FIG. 5 is a front plan view of the delimber showing the support wheels in their transport position and schematically showing the main pump and the motor for driving the delimbing head.
Figure 6:
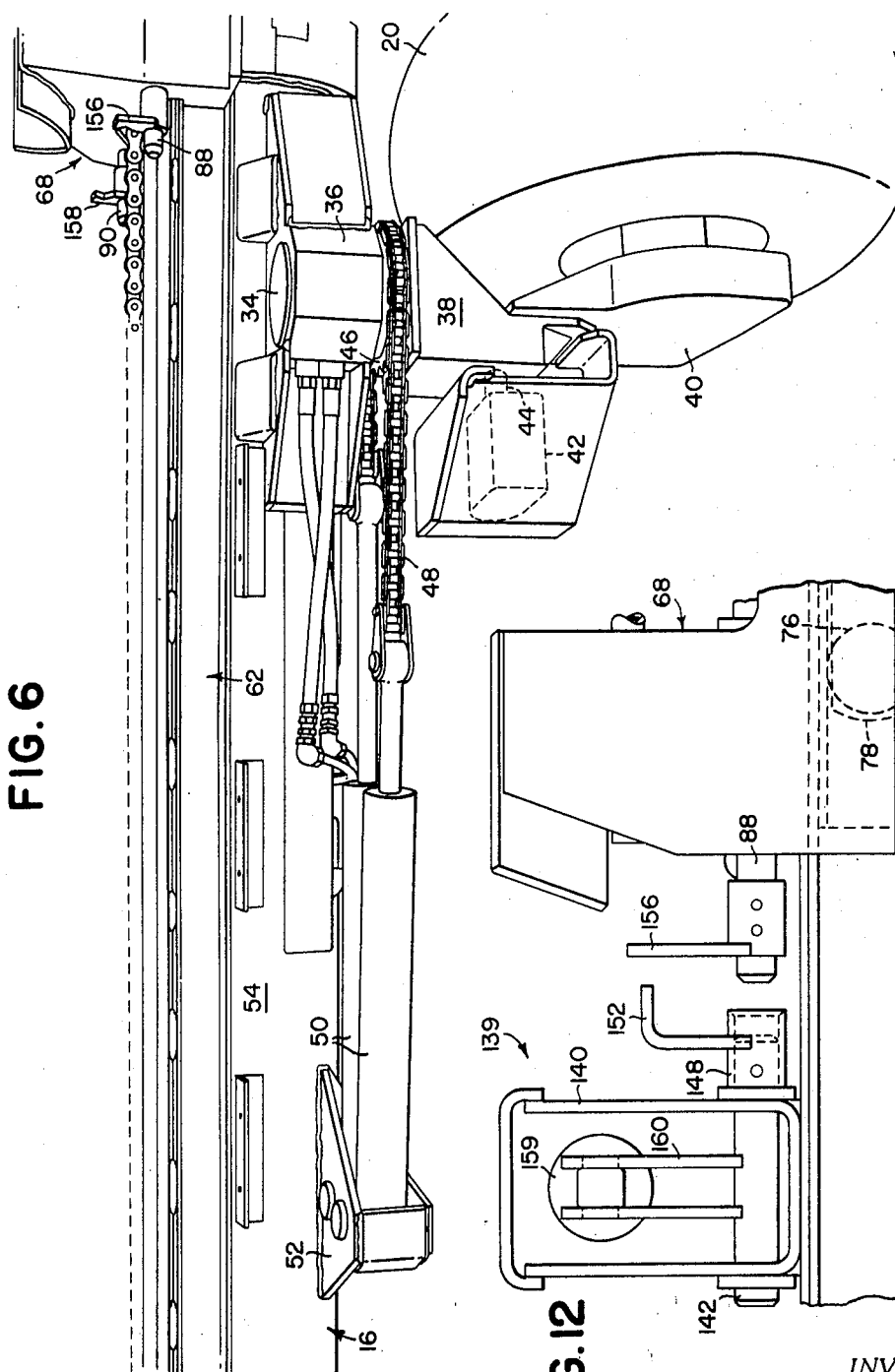
FIG. 6 is a perspective view of the steering mechanism for the support wheel mounted on the elongated leg portion of the T-shaped frame.
Figure 12:
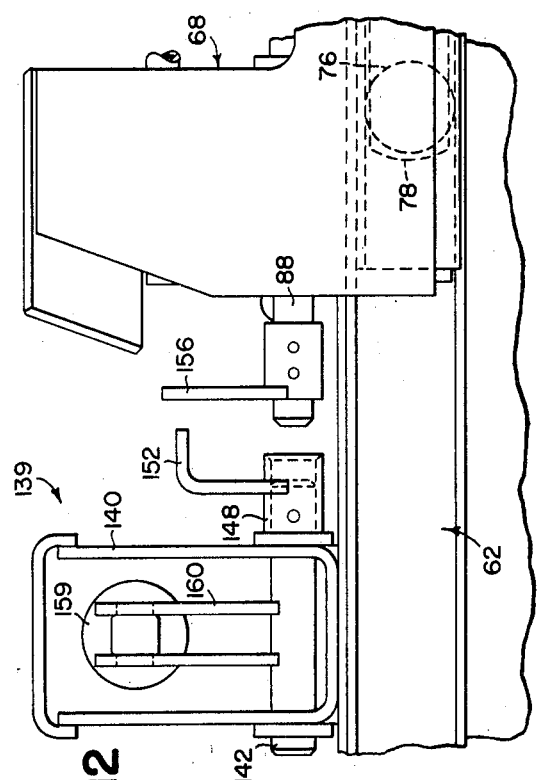
FIG. 12 is a perspective side view showing the parts of the blade assembly and the blade-opening mechanism which cooperate during the opening of the blades.

For the purpose of opening the blades 96 and 98 against the bias of the springs 134, there is provided a power cylinder-operated blade opening assembly 139 including a rectangular housing 140 fixed crosswise to the platform 16 at a location not far removed from the power unit 12. Pivoted in the opposite ends of the housing 140 are a pair of pivot shafts 142 and 144, which are in axial alignment with pilot end portions of the shafts 88 and 90. A pair of cylindrical receptacles 148 and 150 are fixed to the ends of the shafts 142 and 144 and lugs 152 and 154 project first radially then axially from the receptacles. Extending radially from the pilot end portions of the shafts 88 and 90 and disposed for engagement by the operating lugs 152 and 154 are radially extending lugs 156 and 158. A hydraulic actuator 159 extends between and is pivotally connected to cranks 160 and 162 which project upwardly from the shafts 142 and 144. Thus, it can be seen that when the frame 72 is moved toward the assembly 139, the ends of the shafts 88 and 90 will be received in the receptacles 148 and 150 and the lugs 156 and 158 will be located adjacent the inside of the lugs 152 and 154, as shown in FIG. 11. Extension of the actuator 159 will move the lugs 156 and 158 outwardly into engagement with the lugs 152 and 154 and cause the arms 92 and 94 and the associated blades 96 and 98 to move to the open position shown in FIG. 9.

A pair of spring-loaded stops 164 are fixed to the opposite sides of platform 16 adjacent the blade opening assembly 139 for limiting the movement of the delimbing head 68 toward the power unit 12 and a pair of spring-loaded stops 166 are mounted on the opposite sides of the platform 16 adjacent the end remote from the power unit 12 for establishing an outer limit for delimber head movement.

The delimbing head 68 is reversibly driven along the platform 16 between the pairs of stops 164 and 166 by means including a drive sprocket 170 rotatably mounted within the tubular platform member 54 adjacent the power unit 12 and a pulley 172 rotatably mounted at the end of the platform 16 remote from the power unit 12. A drive chain 174 having a length approximately the same as the platform 16 is meshed with the drive sprocket 170 and has an upper run which is received in a guide track 176 fixed centrally along the top of platform 16. The end link of the upper chain run is pinned, as at 178 to the trailing end of the frame 72. The lower run of the chain 174 extends within the tubular section 54 of the platform 16 and is secured at its end (not shown) to one end of a length of cable or wire rope 180. The cable 180 is received on the pulley 172 and is doubled back over the top of the platform 16. The end portion of the cable 180 is received in a tube 182, which is fixed centrally to the delimbing head frame 72. A clamp 184 on the cable 180 prevents the cable from being withdrawn from the tube 182. A reversible hydraulic motor 185 is drivingly connected to the sprocket 170 and it can be seen, that by driving the sprocket 170 so as to place the upper run of the chain 174 in tension, the delimbing head 68 will be advanced toward the power unit 12 and, that by driving the drive sprocket so as to place the lower run of the chain in tension, the delimbing head will be advanced away from the power unit.

A tree topping unit 186 is adjustably fixed to the end of the delimbing platform 16 remote from the power unit 12. The topping unit 186 includes a frame 188 having skirts 190, at its opposite sides, disposed alongside the tracks 62. Rollers 192 are mounted at the opposite ends of the skirts 190 and are disposed in the tracks 62. A pair of stops in the form of screws 194 are located in the upper flange of one of the tracks 62 at the opposite ends of one of the skirts 190 to hold the frame in a desired position. Interconnecting the skirts 190 are a pair of vertical, longitudinally spaced plates 196, which bridge the platform 16. A bed structure 198 is integral with the top of the plates 196 and defines an opening 200 for receiving the top portion of a tree. A chain saw 202 includes a blade 204 which is vertically swingably mounted on the frame 188 in a position so as to traverse a treetop positioned in the opening 200. For this purpose, the drive housing of the saw 202 is fixed to a tubular rockshaft 206, which is journaled in the plates 196. A pair of sprockets 208 are fixed on the rockshaft 206 and have a pair of chains 210 engaged therewith. The chains 210 are also engaged with a pair of sprockets 212 fixed to a drive shaft 214, which is journaled in the plates 196 below the rockshaft 206. A hydraulic actuator 216 is pivotally interconnected between a crank, fixed to the shaft 214, and the frame 188 and is operative upon extension to rotate the saw blade 204 toward a vertical, inoperative position, and is operative upon retraction to rotate the saw blade toward a horizontal, operative position. The saw cutting chain is drive by means of a hydraulic motor 218, which is drivingly connected through means of a chain 220 to a drive shaft 222, which is rotatably mounted within the rockshaft 206.

Trees are elevated from the ground to a delimbing and topping position on the platform 16 by means of a grapple and boom assembly 224. The assembly 224 includes a support post 226 which is mounted on the frame 14 of the power unit 12 for horizontal swinging movement about a vertical axis intersecting the longitudinal axis of the tubular delimbing frame section 54. A telescopic boom 227 having inner and outer sections 228 and 230, respectively, is pivoted at its inner end to the upper portion of the post 226. Fixed to the outer end of the boom section 230 is a downwardly opening grapple 232 including a fixed tong 234 and a tong 236 mounted for pivotal swinging movement toward and away from the fixed tong. Fixed adjacent the outer end of the inner boom section 228 is a downwardly opening V-shaped heeling structure 238 and fixed adjacent the inner end of the boom section 228 is a downwardly projecting butt plate 240.

The various elements of the boom and grapple assembly 224 are selectively positioned by a plurality of hydraulic actuations. More specifically, an actuator 242 is connected between the frame 14 and the post 226, a pair of actuators 244 are connected between the post 226 and the inner boom section 228, an actuator (not shown) is provided for telescopically moving the outer boom section 230 on the inner section 228 and an actuator 246 is connected between the outer boom section 230 and the pivoted tong 232.

The power for operating all of the hydraulic functions associated with the vehicle 10 originates at an internal combustion engine 248, which is mounted on the frame 14 in a position to one side of the platform 16. The engine 248 is drivingly coupled to a pump 250 for supplying pressurized fluid to the various hydraulic functions through means of a manifold and hydraulic lines (not shown).

An operator's station 252 is mounted on the frame 14 to the opposite side of the platform 16 from the engine 248. Controls 254 are located at the station 252 and are representative of the many valve controls for selectively operating the various hydraulic functions. A protective framework 256 encloses the station 252 and is covered by a wire mesh screen 258.

In order to ready the delimbing machine 10 for delimbing operation, the machine 10 is first positioned alongside a pile of felled trees, with the wheels 18, 19 and 20 being turned to their working positions illustrated in FIG. 1 and with the power unit 12 being adjacent the butt ends of the trees. Next, the blades 96 and 98 of the delimbing head 68 are moved to their open position. This is accomplished by operating the delimbing head drive motor 185 to bring the pivot shafts 142 and 144 of the delimbing head 68 into register with the receptacles 148 and 150 of the blade-opening assembly 139. The blade-operating hydraulic actuator 159 is then extended to rotate the shafts 142 and 146 to engage the lugs 156 and 158 with the lugs 152 and 154 which causes rotation of the shafts 88 and 90 so as to swing the blade-carrying arms 92 and 94 away from each other until the blades 96 and 98 occupy the open position illustrated in FIG. 9. It is to be noted that the tension springs 124 maintain the outer blade sections 102 in their outermost position. The saw blade 204 is, at the same time, rotated to a substantially vertical position by extension of the hydraulic actuator 216. This provides access for placing a treetop in the opening 200 of the bed 198 of the topping unit 186. The platform 16 is then in condition for having a tree stem placed on top thereof.

To this latter end, the grapple and boom assembly is positioned, through selective actuation of the actuators 242, 244, 246 and the boom telescoping actuator (not shown), to place the grapple in grasping relationship to a selected tree stem. The stem is then manipulated until its end portion lies underneath the boom sections 228 and 230, with the butt being engaged with the plate 240. The tree stem is then shifted from the ground and since the majority of the weight of the tree stem lies beyond the grapple 232, it pivots downwardly about the grapple and, thus, remains engaged in the heel 238. When the tree stem is longitudinally aligned over the top of the platform 16, it is lowered onto the platform 16 with portions thereof being received in the delimbing head 68 and the topping unit 186. The blade-operating actuator 159 is then retracted, permitting the pairs of compression springs 134 to act through the arms 92 and 94 to yieldingly engage the blades 96 and 98 with the tree stem, which blades cooperate with the fixed blades 84 and 86 to completely encircle the tree stem. The delimbing head motor 183 is then actuated to drive the head 68 towards the spring-loaded stops 166 adjacent the topping unit 186. As the delimbing head 68 advances along the tree stem, the beveled cutting edges along the leading edges of the blades 84, 86, 96 and 98 will cut limbs, by impact, from the stem. The hinged sections 100 and 102 of the blades 96 and 98 act to conform the blades more nearly to irregularities in the tree stem than would be possible if they were rigid blades. When the delimbing head 68 engages the stops 166, the motor 183 is reversed and stubs of branches remaining on the tree stem are removed as the head 68 travels towards the stops 164 to begin another cycle.

The chain saw drive motor 218 is actuated along with the saw swing motor 216 to swing the saw blade 204 downwardly to sever the top from the tree stem. When the top is free, the blade 204 is raised again by extension of the actuator 216.

After the delimbing head 68 is again operatively coupled with the blade opening assembly 139, the actuator 149 is extended to open the blades 96 and 98.

The boom and grapple assembly 224 is then swung to deposit the delimbed and topped stem along the delimbing platform 16 at the side opposite from the unprocessed pile of trees.

The above delimbing and topping procedure is repeated until the entire pile is processed. The vehicle 10 is advanced into the pile by simultaneously actuating the wheel drive motors 30 and 42 for the wheels 18, 19 and 20.

Should it be desired to move the machine 10 endwise in positioning the machine at various piles at a landing site, the lock pins (not shown) fixing the wheel spindles 22 to the frame 14 are disengaged and the motors 30 are actuated to drive the wheels 18 and 19 about their respective spindle axis. When the wheels 18 and 19 are in the transport position, the lock pins are again engaged.

If the machine 10 is to be transported any appreciable distance overland, it may be desirable or necessary to shorten its length. To do this, the fasteners (not shown) securing the tubular frame members 54 and 56 to each other and to the tubular insert 60 are loosened. The drive cable 180 is disconnected from the delimbing head 68 and is disengaged from the pulley 172. A logging tractor or some other vehicle is connected in supporting and endwise-pulling relationship to the frame member 56 and is operated to separate the frame member 56 from the member 54. The separated frame member 56 then is loaded aboard a truck, or the like, for transport to the desired site where it is again rejoined with the frame member 54.

We claim:

1. A self-propelled vehicle for supporting tree delimbing elements comprising: a horizontal T-shaped main frame having an elongated leg portion and a comparatively short head portion; first ground-engaging means supportingly connected to said head portion; second ground-engaging means supportingly connected to said leg portion; power means for driving at least one of said first and second ground-engaging means; and said first and second ground-engaging means being operatively mounted for movement between a working position defining a path of travel parallel to said head portion and a transport position defining a path of travel parallel to said leg portion and direction-changing means for moving said first and second ground-engaging means between said first and second positions.

2. The invention defined in claim 1 wherein said second ground-engaging means is steerable and said direction-changing means includes steering means operatively connected to said second ground-engaging means.

3. A self-propelled vehicle for supporting tree delimbing elements comprising: a horizontal T-shaped main frame having an elongated leg portion and a comparatively short head portion; first ground-engaging means supportingly connected to said head portion; second ground-engaging means supportingly connected to said leg portion; power means for driving at least one of said first and second ground-engaging means; and said first ground-engaging means including a pair of wheels mounted adjacent opposite ends of said head portion for horizontal swivelling and wherein said second ground-engaging means includes a third wheel mounted on said leg portion for horizontal swivelling and means for retaining said wheels in desired swivelled positions.

4. The invention defined in claim 3 wherein said pair of wheels are respectively offset from their swivel axis, wherein said power means includes a pair of motors respectively drivingly connected to and mounted to swivel with said pair of wheels and wherein said means for retaining includes locking means for selectively locking said pair of wheels in a first position parallel to said head portion and in a second position parallel to said leg portion whereby said motors are operative to rotate said pair of wheels about their swivel axes between said first and second positions when said lock means are disengaged.

5. The invention defined in claim 4 wherein said third wheel is steerable, wherein said means for retaining further includes a shiftable steering linkage operatively connected to steer said third wheel and wherein said power means further includes a third motor drivingly connected to said third wheel.

6. The invention defined in claim 1 wherein said leg portion includes a first section joined to said head portion and a remote section; and joint means releasably interconnecting said first and remote sections in axially aligned, end-to-end relationship.

7. The invention defined in claim 6 wherein said first and second ground-engaging means are the sole means supporting said main frame and said second ground-engaging means being located approximately midway along the length of said leg portion thus establishing a cantilevered portion and said joint means being located in said cantilevered portion adjacent said second ground-engaging means whereby the majority of said cantilevered portion may be removed to ready the vehicle for transport.

8. The invention defined in claimed 7 wherein said leg portion is tubular and wherein a tubular connecting section is received in the removable cantilevered portion and in the remaining portion so as to form part of said joint means.

9. The invention defined in claim 1 and further including an operator's station mounted on said head portion and wherein said power means includes a power-supplying motor mounted on said head portion.

10. A self-propelled vehicle for supporting tree delimbing apparatus comprising: a power unit including a horizontal supporting frame; an elongated delimbing platform extending perpendicular to the length of and having one end fixed to said supporting frame; first rotatable ground-engaging means supportingly connected to said frame; second rotatable ground-engaging means supportingly connected to said platform; power means drivingly connected to at least one of said first and second ground-engaging means for selectively rotating the latter; and said first and second ground-engaging means are operatively mounted for movement between a working position defining a path of travel parallel to said frame and a transport position defining a path of travel parallel to said platform and direction-changing means for moving said first and second ground-engaging means between said first and second positions.

11. The invention defined in claim 10 wherein said second ground-engaging means is steerable and said direction-changing means includes steering means operatively connected to said second ground-engaging means.

12. A self-propelled vehicle for supporting tree delimbing apparatus comprising: a power unit including a horizontal supporting frame; an elongated delimbing platform extending perpendicular to the length of and having one end fixed to said supporting frame; first rotatable ground-engaging means supportingly connected to said frame; second rotatable ground-engaging means supportingly connected to said platform; power means drivingly connected to at least one of said first and second ground-engaging means for selectively rotating the latter; and said first ground-engaging means includes a pair of wheels mounted adjacent opposite ends of said frame for horizontal swivelling and wherein said second ground-engaging means includes a third wheel mounted on said platform for horizontal swivelling and means for retaining said wheels in desired swivelled positions.

13. The invention defined in claim 12 wherein said pair of wheels are respectively offset from their swivel axis, wherein said power means includes a pair of motors respectively drivingly connected to and mounted to swivel with said pair of wheels and wherein said means for retaining includes locking means for selectively locking said pair of wheels in a first position parallel to said head portion and in a second position parallel to said leg portion whereby said motors are operative to rotate said pair of wheels about their swivel axes between said first and second positions when said lock means are disengaged.

14. The invention defined in claim 13 wherein said third wheel is steerable, wherein said means for retaining further includes a shiftable steering linkage operatively connected to steer said third wheel and wherein said power means further includes a third motor drivingly connected to said third wheel.

15. The invention defined in claim 10 and further including a rigid disconnectible joint in said platform section adjacent said second ground-engaging means whereby a portion of said platform may be removed to ready the vehicle for transport.

16. The invention defined in claim 15 wherein said platform is tubular and wherein a tubular connecting section is received in the removable platform section and in the remaining section so as to form part of said rigid disconnectible joint.

17. The invention defined in claim 10 wherein said power unit includes an operator's station mounted on said frame and wherein said power means includes a power-supplying motor mounted on said frame next to the operator's station.

18. The invention defined in claim 10 wherein said platform includes a first section joined to said frame and a remote section; and joint means releasably interconnecting said first and remote sections in axially aligned, end-to-end relationship.

\* \* \* \* \*